US010755330B1

(12) United States Patent
Halem

(10) Patent No.: US 10,755,330 B1
(45) Date of Patent: Aug. 25, 2020

(54) GEO DETECTION SYSTEMS AND METHODS

(71) Applicant: PayRay Inc., New York, NY (US)

(72) Inventor: Zachery Halem, Harrison, NY (US)

(73) Assignee: PAYRAY INC., New York, NY (US)

( * ) Notice: Subject to any disclaimer, the term of this patent is extended or adjusted under 35 U.S.C. 154(b) by 556 days.

(21) Appl. No.: 15/491,807

(22) Filed: Apr. 19, 2017

(51) Int. Cl.
*G06Q 30/06* (2012.01)
*G06K 7/14* (2006.01)
*G06K 7/10* (2006.01)

(52) U.S. Cl.
CPC ..... *G06Q 30/0625* (2013.01); *G06K 7/10297* (2013.01); *G06K 7/1417* (2013.01)

(58) Field of Classification Search
CPC .................................................... G06Q 30/06
USPC ...................................................... 705/26–27
See application file for complete search history.

(56) References Cited

U.S. PATENT DOCUMENTS

| 8,233,841 | B2 | 7/2012 | Griffin |
| 8,292,184 | B2 | 10/2012 | Turbovich |
| 8,430,317 | B2 | 4/2013 | Ross |
| 9,367,841 | B2 | 6/2016 | Zhou |
| 2004/0111320 | A1 | 6/2004 | Schlieffers |
| 2010/0020970 | A1 | 1/2010 | Liu |
| 2011/0137742 | A1 | 6/2011 | Parikh |
| 2011/0251910 | A1 | 10/2011 | Dimmick |
| 2012/0136739 | A1 | 5/2012 | Chung |
| 2012/0166337 | A1 | 6/2012 | Park |
| 2012/0303483 | A1 | 11/2012 | Lee |
| 2013/0006872 | A1 | 1/2013 | Chandoor |
| 2013/0200145 | A1 | 8/2013 | Cameron |
| 2013/0256403 | A1 | 10/2013 | MacKinnon Keith |
| 2014/0101056 | A1 | 4/2014 | Wendling |
| 2014/0121967 | A1* | 5/2014 | Anbalagan ......... G01C 21/3476 701/540 |

(Continued)

FOREIGN PATENT DOCUMENTS

WO    WO 2015121833    8/2015

OTHER PUBLICATIONS

Farahani, R. Z., Rezapour, S., Drezner, T., Esfahani, A. M., & Amiri-aref, M. (2015). Locating and capacity planning for retailers of a new supply chain to compete on the plane. The Journal of the Operational Research Society, 66(7), 1182-1205. (Year: 2015).*

(Continued)

*Primary Examiner* — Michael Misiaszek
*Assistant Examiner* — Latasha D Ramphal
(74) *Attorney, Agent, or Firm* — Leason Ellis LLP

(57) ABSTRACT

A processor receives from a plurality of devices location information and generates nearby store information that is transmitted to a devices. Enter store event information is received at a first time and stored in at least one database. Item information is received at a second time. The processor generates and transmits item details information representing at least price, tax and inventory availability associated with the item. Purchase event information representing a purchase of the item from the one store is received by the processor over a communication network at a third time, from the one of the plurality of computing devices, and the processor updates, as a function of the received purchase event information, at least one database associated with item inventory of the one store.

14 Claims, 12 Drawing Sheets

(56) References Cited

U.S. PATENT DOCUMENTS

2014/0156459 A1* 6/2014 Zises .................. G06Q 30/0623
                                                        705/26.61
2014/0372300 A1   12/2014 Blythe
2015/0106449 A1*  4/2015 Cherry ................... H04L 67/22
                                                        709/204

OTHER PUBLICATIONS

Gallo, O. & Manduchi, R. "Reading 10 Barcodes with Mobile Phones Using Deformable Templates", Pattern Analysis and Machine Intellignece, IEEE Transactions (Sep. 2011) vol. 33, Iss. 9, pp. 1834-1843.

* cited by examiner

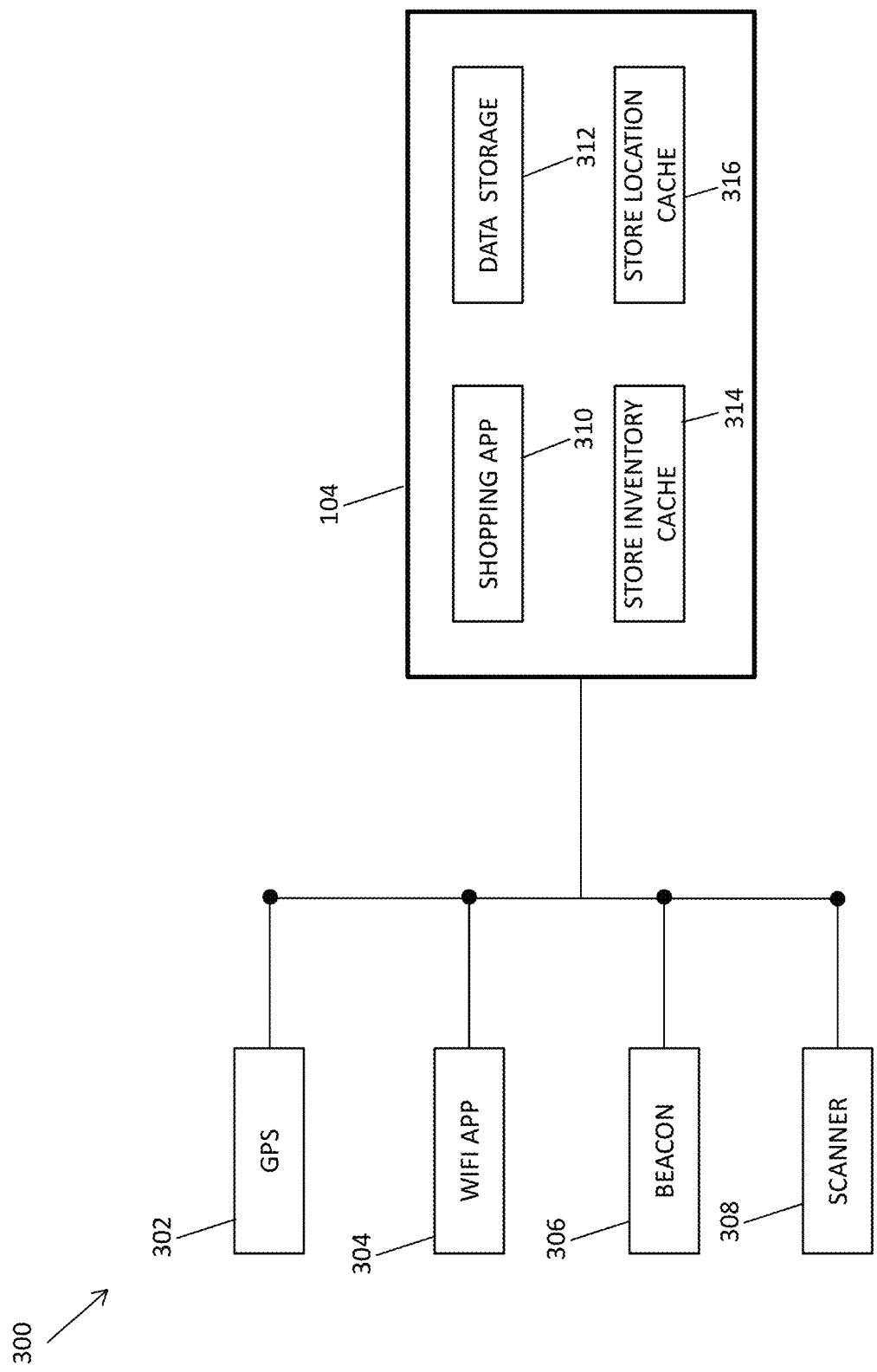

GEO DETECTION SYSTEMS AND METHODS

CROSS-REFERENCE TO RELATED APPLICATION

This application incorporates by reference U.S. patent application Ser. No. 14/885,149 and filed on Oct. 16, 2015, which is based on and claims priority to U.S. Provisional Application 62/065,439, filed on Oct. 17, 2014, the entire contents of both of which are incorporated by reference as if expressly set forth in its respective entirety herein.

FIELD OF THE INVENTION

The present invention relates generally to back-end processing and, more particularly, to integrating a plurality of client and server computing devices for location-based services.

BACKGROUND OF THE INVENTION

As modern technology grows, the capabilities of everyday electronic devices continue to expand. The day-to-day functions of modern smart phones, tablet computers, laptop computers, and notebook computers have made them nearly indispensable to their users. In many cases, the programs and applications that are executed on these processing devices are used to assist users in the management of their daily lives, making everyday tasks simpler, faster, and more efficient. Moreover, the miniaturization of modern processing devices has allowed users to have greater processing power in the palms of their hands. What was once the laptop computer of a few years ago is now found in a smart phone, and what was once the desktop computer is now found in a tablet computer. As a result, users are taking these mobile devices with them everywhere, and using these devices to assist in managing their lives.

One area where modern processing devices is lacking in substantial growth regards location-based services, particularly with regard to brick-and-mortar store locations. Typically, a person walks into a store to purchase an item and is unaware of product availability, price, store hours, alternate store locations or other important information. However, as modern mobile devices become more integrated into our daily lives, it is often the case that the person will have his/her mobile device.

Furthermore, many stores still only use broad-based signage to assist shoppers with store layouts and product locations. Typically, a purchaser will browse shelves in order to locate specific items to purchase. Some stores have tried to alleviate this problem with scanners and other technology, however purchasers often still have to locate a specific file within a store, and browse multitudes of products just to locate a single item to purchase.

SUMMARY OF THE INVENTION

Thus, there is a need for improvements and data management, connectivity, communications and processing in connection with location-based systems and methods.

Systems and methods are disclosed herein that include a receiving, by a processor over a communication network from each of a plurality of respective user computing devices, location information representing at least a respective location of each of the plurality of user computing devices. The processor is further configured to generate, as a function of the received location information, nearby store information representing at least one store located within a predetermined distance from a respective location of at least one of the plurality of user computing devices. Moreover, at least some of the generated store information is transmitted, by the processor to a respective one of the plurality of user computing devices. Enter store event information representing a first data transfer between the one user computing device and at least a computing device associated with a store represented by the nearby store information is received, by the processor over a communication network at a first time from one of the plurality of computing devices. At least some of the received enter store event information is stored, by the processor, in at least one database. Moreover, item information representing an item offered for sale by the one store represented by the nearby store information is received from the one of the plurality of computing devices, by the processor over a communication network at a second time. The processor is configured to generate, as a function of the received item information, item details information representing at least price, tax and inventory availability associated with the item, and at least some of the generated item details information is transmitted, by the processor to the one of the plurality of user computing device. Purchase event information representing a purchase of the item from the one store is received by the processor over a communication network at a third time, from the one of the plurality of computing devices, and the processor updates, as a function of the received purchase event information, at least one database associated with item inventory of the one store.

In one or more implementations, each of the respective plurality of user computing devices is configured with a software application to generate the location information as a function of network information received by: a global positioning system receiver; a Wi-Fi network receiver; a radio-frequency signal receiver; and/or an image receiver.

In one or more implementations, the software application further configures each of the respective plurality of user computing devices to awaken from a sleep state upon reception of the received network information, and generate the location information after awakening from the sleep state.

In one or more implementations, the processor receives over a communication network at a fourth time from the one of the plurality of computing devices, exit store event information representing a data transfer between the one user computing device and at least a computing device associated with the store represented by the nearby store information;

In one or more implementations, the at least one database is updated by the processor as a function of an application programming interface.

In one or more implementations, the processor generates as a function of the received enter store event information, store map information representing a store layout of the one store, wherein at least a portion of the store map information is formatted as a graphical image. Further, further the processor is configured to transmit to the one of the plurality user computing devices, at least some of the generated store map information.

In one or more implementations, the processor is configured to modify the store map information to represent a location within the store layout where the item is located in the store, and to transmit to the one of the plurality user computing devices, at least some of the modified store map information.

In one or more implementations, the generated store map information is transmitted by the processor prior to the second time, and the modified store map information is transmitted by the processor after the second time.

In one or more implementations, the processor is configured to generate a purchase receipt for the item, and to transmit to the one of the plurality of user computing devices, the purchase receipt.

In one or more implementations, the nearby store information is generated as a function of: a number of stores within the predetermined distance; a price of at least one item offered for sale in the at least one store; and/or a calculated distance.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. It is noted that the drawings of the invention are not to scale. The drawings are mere schematics representations, not intended to portray specific parameters of the invention. Understanding that these drawings depict only typical embodiments of the invention and are not, therefore, to be considered to be limiting its scope, the invention will be described and explained with additional specificity and detail through the use of the accompanying drawings, in which:

FIGS. 3A and 3B are simple block diagrams illustrating a plurality of hardware and/or software modules that are provided and/or configured in connection with one or more implementations of the present application;

DETAILED DESCRIPTION

Figure 1:
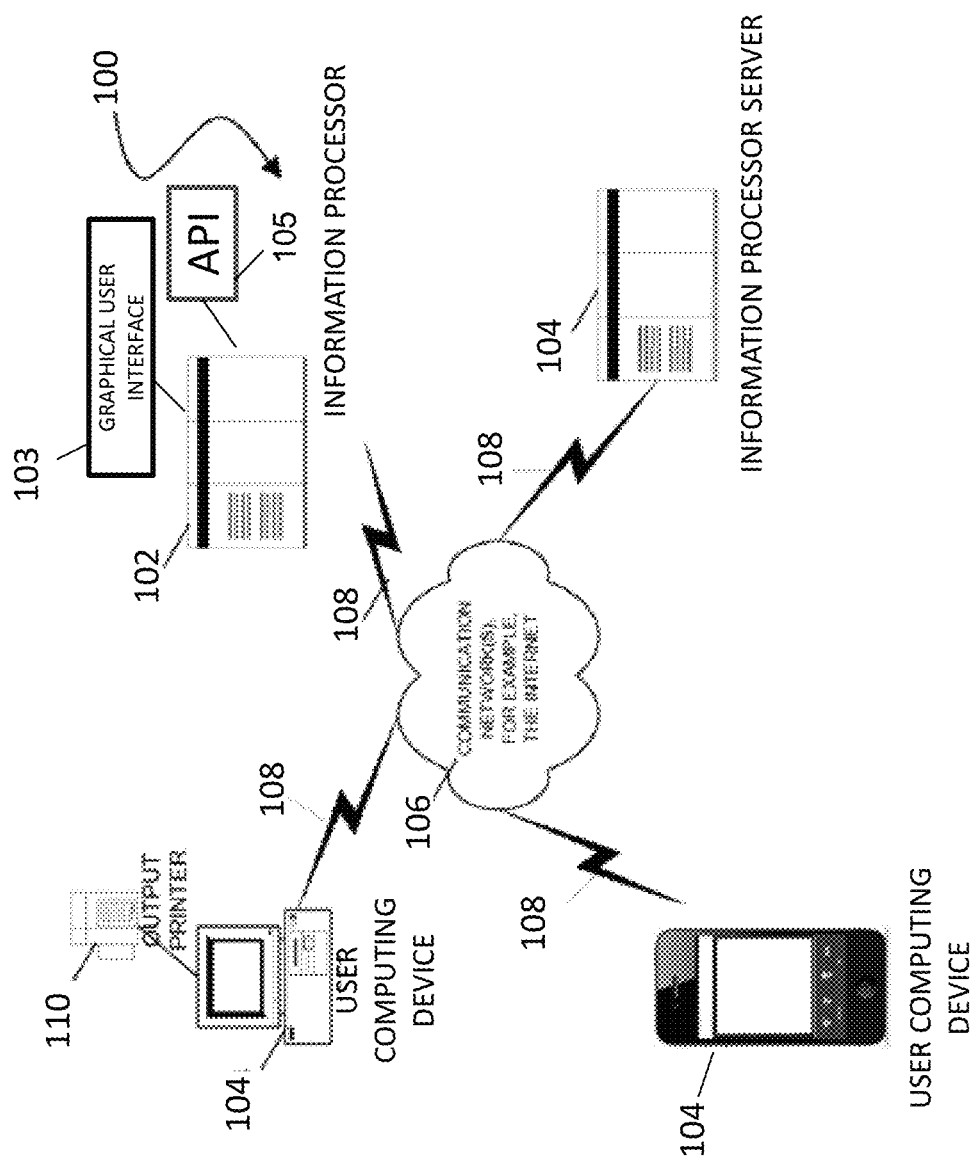
FIG. 1 is a diagram illustrating an example hardware arrangement that operates for providing the systems and methods disclosed herein.

For the purposes of promoting an understanding of the principles of the invention, reference will now be made to the exemplary implementations, including as illustrated in the drawings, and specific language will be used to describe the same. It is to be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the application.

Reference throughout this specification to an "implementation," "embodiment," an "example" or similar language means that a particular feature, structure, characteristic, or combinations thereof described in connection with the embodiment is included in at least one embodiment of the present invention. Thus, appearances of the phrases an "embodiment," "embodiment," an "example," and similar language throughout this specification may, but do not necessarily, all refer to the same embodiment, to different embodiments, or to one or more of the figures. Additionally, reference to the wording "embodiment," "embodiment," "example" or the like, for two or more features, elements, etc. does not mean that the features are necessarily related, dissimilar, the same.

In accordance with one or more implementations, systems, methods, and computer program products are provided herein to provide an automatic and efficient structure for effecting location-based services in accordance with the teachings herein. In one or more implementations, cloud computing is a model of service delivery for enabling convenient, on-demand network access to a shared pool of configurable computing resources (e.g. networks, network bandwidth, servers, processing, memory, storage, applications, virtual machines, and services) that is rapidly provisioned and released with minimal management effort or interaction with a provider of the service. This cloud model may include a plurality of characteristics, service models, and deployment models, as known in the art.

Referring to FIG. 1, a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers that can communicate over wired and/or wireless data communication networks. Further, a computing device may be configured as a data processing apparatus 102 and a user computing device 104, depending upon operations being executed at a particular time. The software instructions can be configured as a broadcaster and can take various forms, such as a plug-in, add-in, extension or the like, that operate with an existing computer program, including a web-browser software application. Also illustrated in FIG. 1 is graphical user interface 103 and application programming interface(s) 105, which can be provided to configure data processing apparatus 102, in accordance with the teachings herein.

With continued reference to FIG. 1, data processing apparatus 102 can be configured to access one or more databases for the present application, including image files, video content, documents, audio/video recordings, metadata and other information. It is contemplated that data processing apparatus 102 can access any required databases via communication network 106 or any other communication network to which data processing apparatus 102 has access. Data processing apparatus 102 can communicate with devices comprising databases using any known communication method, including wirelessly or wired, such as via a direct serial, parallel, universal serial bus ("USB") interface, or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and can be equipped with cameras, microphones and software applications, including web browsers or other applications. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

Thus, according to implementations of the present application, user computing device 104 provides user access to data processing apparatus 102 for the purpose of receiving and providing information. The specific functionality provided by system 100, and in particular data processing apparatuses 102, is described in detail below.

Moreover, system 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
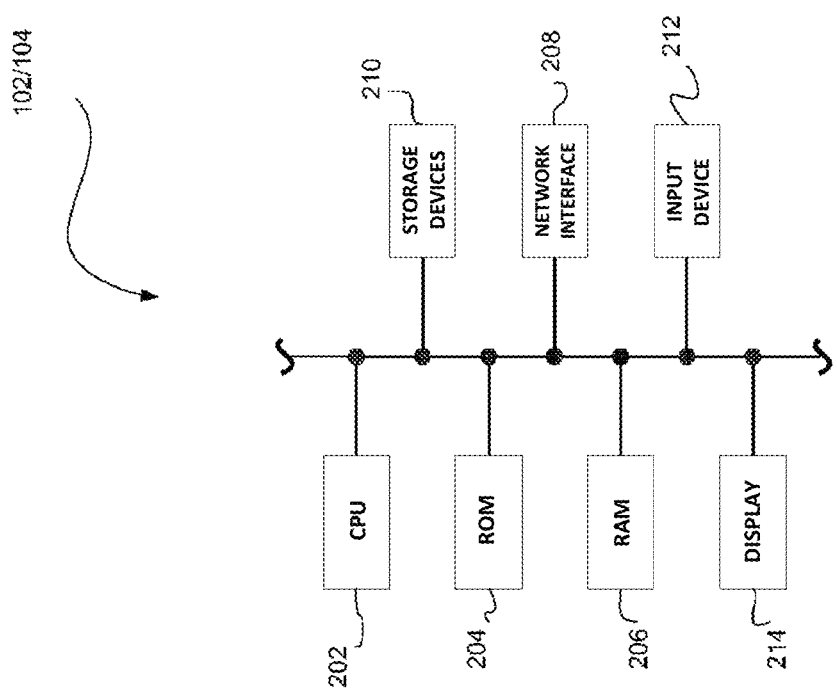
FIG. 2 illustrates, in block diagram form, an exemplary data processing apparatus and/or user computing device that can provide functionality in accordance with the teachings herein.

FIG. 2 illustrates example functional elements of each data processing apparatus 102 or user computing device 104, and preferably includes one or more processors 202 used to execute software code in order to control operation of data processing apparatus 102/user computing device 104, read only memory (ROM) 204, random access memory (RAM) 206 or any other suitable volatile or non-volatile computer readable storage medium, which can be fixed or removable. FIG. 2 also includes one or more network interfaces 208 to transmit and receive data to and from other computing devices across a communication network. The network interface 208 can be any interface that enables communication between the any of the devices (e.g., 102 or 104) shown in FIG. 1A includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the devices and/or communication networks, such as private networks and the Internet. Such connections can include a wired connection or a wireless connection (e.g., using the IEEE 802.11 standard known in the relevant art) though it should be understood that network interface 208 can be practically any interface that enables communication to/from the processor 202.

Continuing with reference to FIG. 2, storage device(s) 210 can be included such as a hard disk drive, floppy disk drive, tape drive, CD-ROM or DVD drive, flash memory, rewritable optical disk, rewritable magnetic tape, or some combination of the above for storing program code, databases and application code. In certain implementations, memory 204, 206 and/or storage device(s) 210 are accessible by the processor 202, thereby enabling the processor 202 to receive and execute instructions stored on the memory 204, 206 and/or on the storage 210. Further, elements include one or more input devices 212 such as a keyboard, mouse, track ball and the like, and a display 214. The display 214 can include a screen or any other such presentation device that enables the system to instruct or otherwise provide feedback to the user regarding the operation of the system 100. By way of example, display 214 can be a digital display such as an LCD display, a CRT, an LED display, or other such 2-dimensional display as would be understood by those skilled in the art. By way of further example, a user interface and the display 214 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So, when the touch screen is touched, interface communicates this change to processor, and settings can be changed or user entered information can be captured and stored in the memory.

One or more software modules can be encoded in the storage device(s) 210 and/or in the memory 204, 206. The software modules can comprise one or more software programs or applications having computer program code or a set of instructions executed in the processor 202. Such computer program code or instructions for carrying out operations or aspects of the systems and methods disclosed herein can be written in any combination of one or more programming languages, as would be understood by those skilled in the art. The program code can execute entirely on one computing device (e.g., data processing apparatus 102) as a stand-alone software package, partly on one device and partly on one or more remote computing devices, such as, a user computing device 104, or entirely on such remote computing devices. In the latter scenario and as noted herein, the various computing devices can be connected to the data processing apparatus 102 through any type of wired or wireless network, including a local area network (LAN) or a wide area network (WAN), or the connection can be made to an external computer (for example, through the Internet using an Internet Service Provider). It should be understood that in some illustrative embodiments, one or more of the software modules can be downloaded over a network from another device or system via the network interface 208. For instance, program code stored in a computer readable storage device in a server can be downloaded over a network from the server to the storage 210.

It is to be appreciated that several of the logical operations described herein are implemented (1) as a sequence of computer implemented acts or program modules running on the various devices of the system 100 and/or (2) as interconnected machine logic circuits or circuit modules within the system 100. The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Thus, the various components of data processing apparatus 102 need not be physically contained within the same chassis or even located in a single location. For example, as explained above with respect to databases which can reside on storage device 210, storage device 210 may be located at a site which is remote from the remaining elements of data processing apparatus 102, and may even be connected to CPU 202 across communication network 106 via network interface 208.

The nature of the present application is such that one skilled in the art of writing computer executed code (software) can implement the described functions using one or more or a combination of a popular computer programming languages and technologies including, but not limited to, C++, VISUAL BASIC, JAVA, ACTIVEX, HTML, XML, ASP, SOAP, IOS, ANDROID, TORR and various web application development environments.

As used herein, references to displaying data on user computing device 104 refer to the process of communicating data to the computing device across communication network 106 and processing the data such that the data can be viewed on the user computing device 104 display 214 using a web browser or the like. The display screens on user computing device 104 present areas within system 100 such that a user can proceed from area to area within the system 100 by selecting a desired link. Therefore, each user's experience with system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of system 100.

As used herein, the terms "function" or "module" refer to hardware, firmware, or software in combination with hardware and/or firmware for implementing features described herein. In the hardware sense, a module can be a functional hardware unit designed for use with other components or modules. For example, a module may be implemented using discrete electronic components, or it can form a portion of an entire electronic circuit such as an Application Specific Integrated Circuit (ASIC). Numerous other possibilities exist, and those of ordinary skill in the art will appreciate that the system can also be implemented as a combination of hardware and software modules. In the software sense, a module may be implemented as logic executing in a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware. Moreover, the modules described herein can be implemented as software modules, but may be represented in hardware or firmware. Generally, the modules described herein refer to logical modules that may be combined with other modules or divided into sub-modules despite their physical organization or storage.

Additional components, not shown, may also be part of the data processing apparatus 102 and/or user computing device 104, and, in certain embodiments, fewer components than that shown in FIG. 2 may also be used in data processing apparatus 102 and/or user computing device 104. Thus, the techniques are not limited to any specific combination of hardware circuitry and software, or to any particular source for the instructions executed by the data processing apparatus 102 and/or user computing device 104.

Figure 3B:
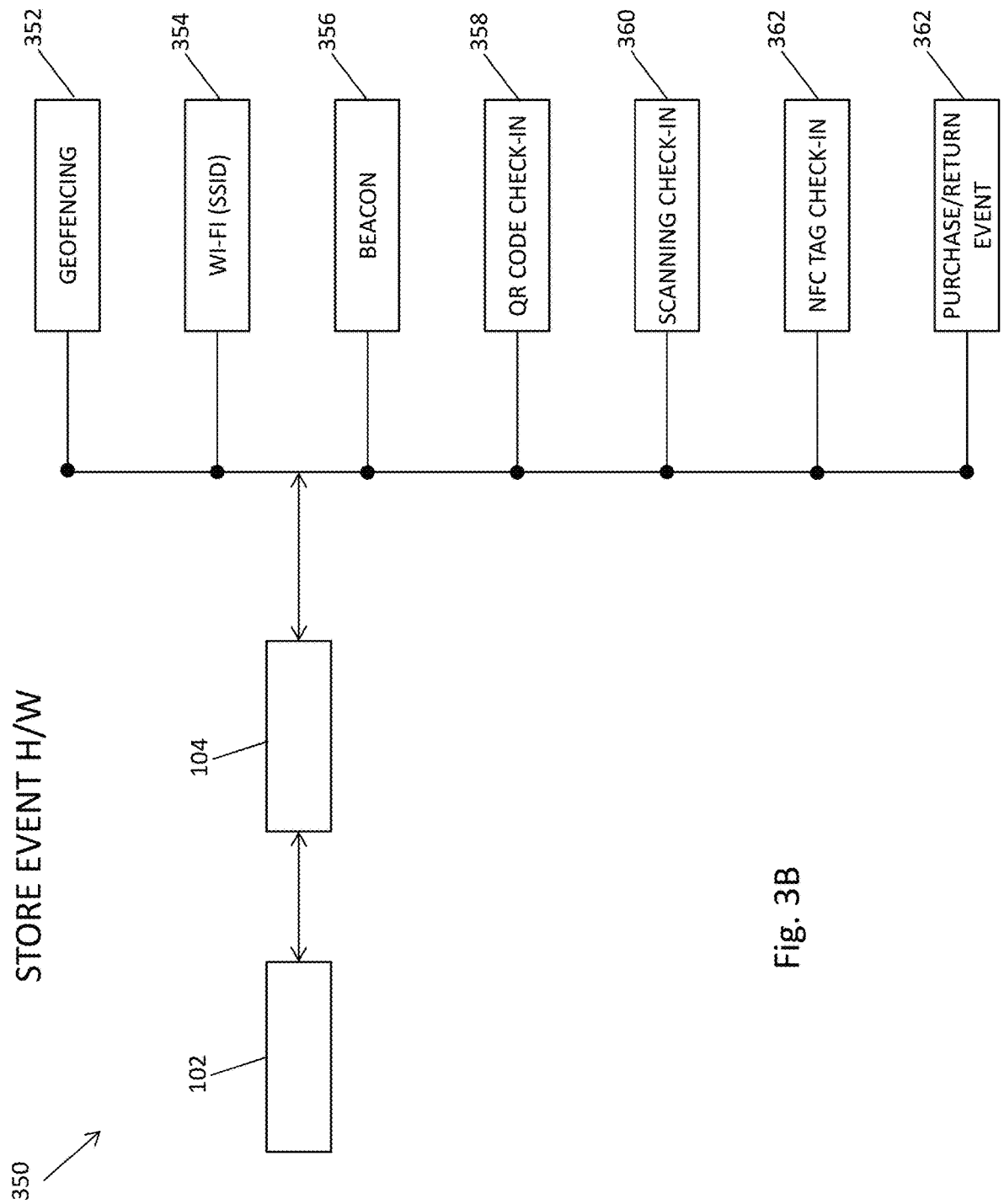

FIGS. 3A and 3B are simple block diagrams illustrating a plurality of hardware and/or software modules 300 implemented and/or configured in connection with one or more implementations of the present application. The respective hardware and software modules illustrated in FIG. 3A are accessible and/or configured with a user computing device 104 in accordance with an example implementation. With respect to data gathering and collection, GPS module 302, Wi-Fi module 304, beacon module 306 and scanner module 308 can be configured with or otherwise accessible to user computing device 104 to provide access to information via one or more data communication protocols and communication pathways. For example, a user's location can be determined as a function of a GPS receiver configured with user computing device 104 that locks on a signal of at least three satellites to determine latitude, longitude and altitude. Beacon module 306 can include Bluetooth and Bluetooth Low Energy ("BLE") technology for transmitting data over short distances and receive packets of data having respective identifiers and determining proximity (i.e., distance) from one or more respective transmitters (e.g., a beacon) transmitting from a specific location, such as in a brick-andmortar store. Scanner module 308 can be configured to obtain information stored in a barcode or other machine-readable code. For example, a camera configured with user computing device 104 can capture an image of a machine-readable code, which is thereafter read by the computing device executing one or more instructions stored in processor-readable media. In one or more implementations, scanner module 308 can scan a quick response ("QR") code to transmit, receive, access and/or share data in various contexts. Information can be transmitted wirelessly to and from computing devices 104 and/or 102 as a function of Wi-Fi module 304. Moreover, shopping application 310, data storage 312, store inventory cache 314 and store location cache 316 represent modules containing software instructions and database storage (or access thereto) in order to implement many of the functions shown and described herein. One or more of the applications executing on user computing device 104 can provide one or more graphical user interfaces to provide and receive information and selections from users, including in connection with the respective storage and caches provided with or accessible to user computing device 104.

With reference to FIG. 3B, a plurality of hardware and/or software modules 350 associated with a respective brick-and-mortar store are shown and that are implemented at least in part to interface with one or more user computing devices 104. For example, geofencing module 352 can be configured to transmit signals representing a virtual geographic boundary to one or more user computing devices 104. Moreover, a Wi-Fi-service set identifier ("SSID") module 354 is usable to differentiate a respective networks and locations, and can further provide or contribute to geofencing, as can beacon module 356. Other store-related modules including check-in procedures can represent the presence of a respective computing device 104 and associated person. For example, a user computing device 104 can scan a QR code to alert presence, or a presence can be indicated as a function of near field transmission (NFC), such as a user computing device 104 reading a NFC tag provided at a vendor's location. Other events can relate to interactions with products, such as a purchase or return event module 362 detecting the occurrence of a purchase or return of a product.

Figure 4:
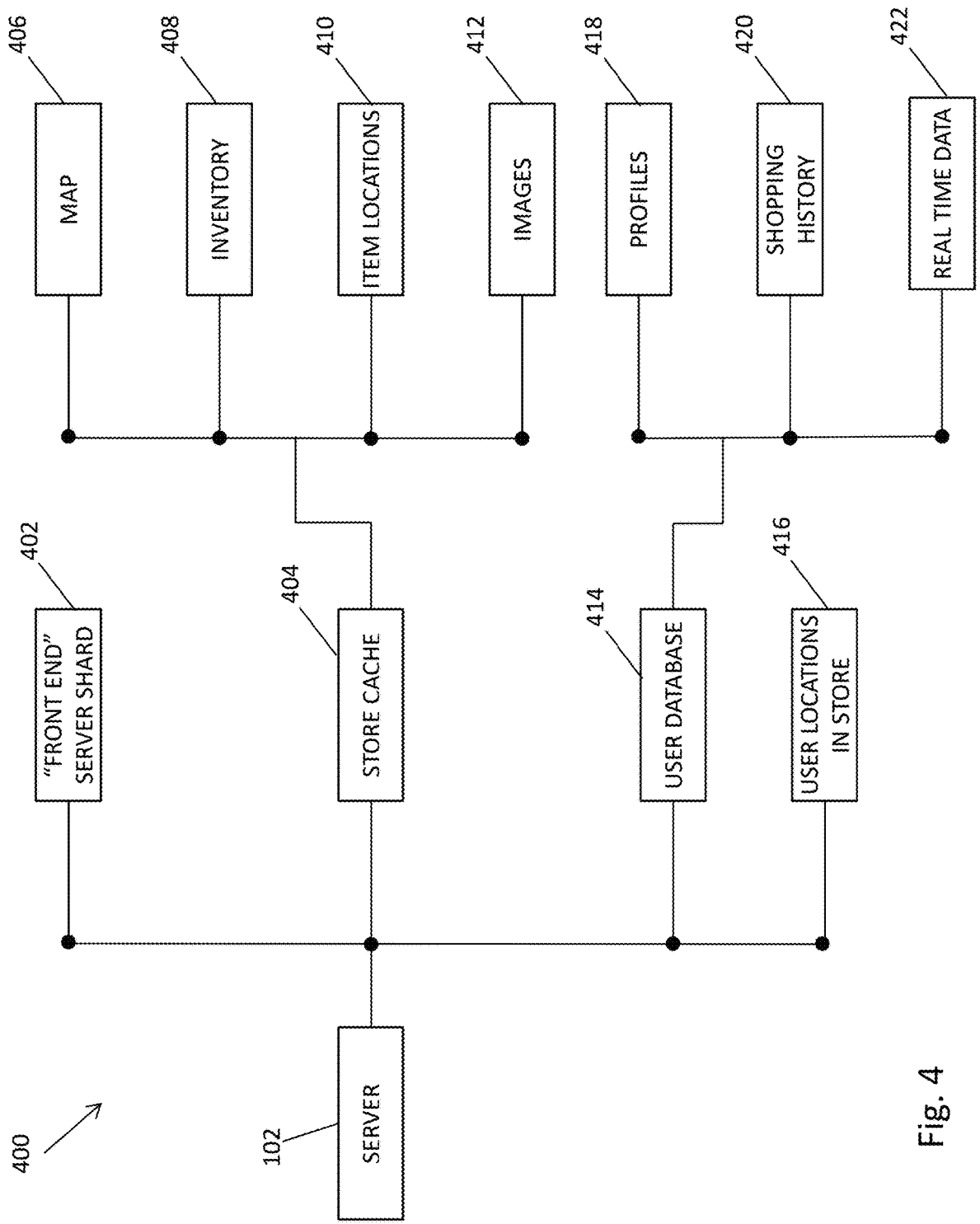
FIG. 4 is a block diagram illustrating hardware and/or software modules associated with one or more server computing devices, in accordance with one or more implementations of the present application.

FIG. 4 is a block diagram illustrating hardware and/or software modules 400 associated with one or more data processing apparatuses 102. For example and as illustrated in FIG. 4, "front end" server shard 402 is provided that includes one or more graphical user interfaces usable for authorized users to access features, including store cache 404, user database(s) 414 and user locations with respective stores 416. Store cache 404 can include maps 406, which can include locations of stores within geographic vicinities. Maps 406 can also represent locations within specific stores, such as a store layout. Store cache 404 can further include inventory 408, representing goods and materials that a respective business has for sale. Store cache 404 can further include item locations 410 can include information representing specific locations within a location where items can be found, as well as images 412 which can include pictures of items for sale at respective store locations.

Continuing with reference to FIG. 4, user database(s) 414 can include storage and access to information associated with individual users, such as user profiles 418 containing a user's preferences, demographics, browsing history, or the like. Shopping history 420 can include specific purchases made in the past by a user, and real-time data 422 can include activity and events, such as in connection with modules 350 (FIG. 3B), accessible and stored substantially in real-time and as respective events occur.

Figure 5:
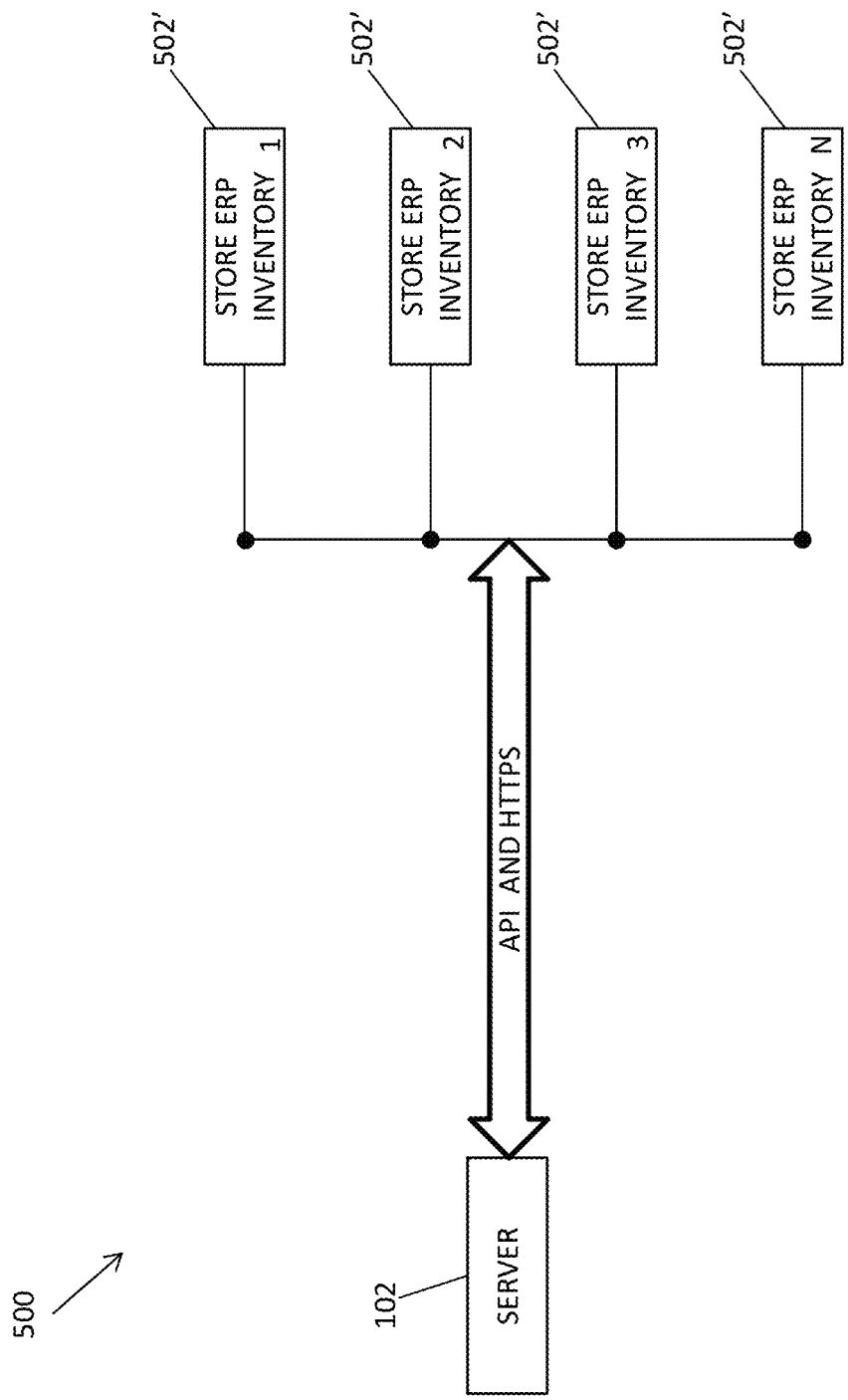
FIG. 5 is a block diagram illustrating interactivity between a data processing apparatus, such as a data processing apparatuses, and computing devices, in accordance with one or more implementations of the present application.

FIG. 5 is a simple block diagram illustrating interactivity between a data processing apparatus 102, such as a server computing device, and devices 502', which can be respectively associated with each of a plurality of brick and mortar store locations. Such interactivity can be effected, at least in part, via API's enabling access to and from devices 502' and data processing apparatus 102.

Figure 6:
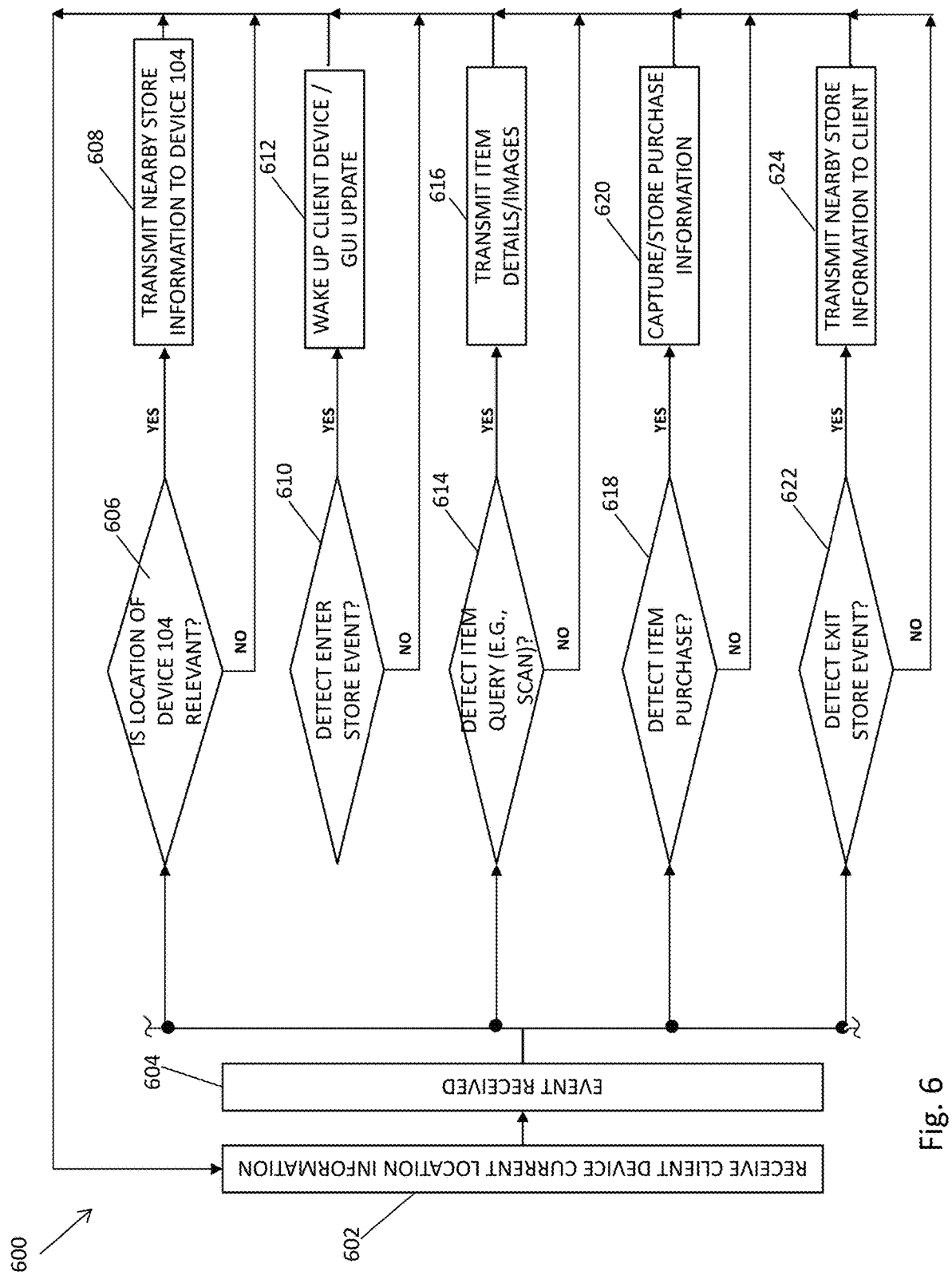
FIG. 6 is a process flow diagram of an example method representing interactions between backend processors and one or more user computing devices, in accordance with one or more implementations of the present application.

FIG. 6 is a process flow diagram of an example method representing interactions between backend processors (e.g., data processing apparatus 102) and one or more user computing devices 104. The method 600 is implemented with any suitable computing device(s), such as a data processing apparatus 102 of FIG. 1. Example data processing apparatuses 102 can include server computing devices employed by retailers. Many of the steps 600 illustrated in FIG. 6 can include geo-fencing, Wi-Fi SSID recognition, NFC devices, GPS devices, or other suitable technology shown and described herein, or otherwise known to one of ordinary skill in the art. Further, events can occur with regard to user computing devices 104 operated by users who visit respective brick and mortar store locations.

Continuing with reference to FIG. 6, at step 602 location information representing the current location of a user computing device 104 is received. At 604, information representing an event associated with the computing device 104 is received. Steps 606, 610, 614, 618 622 represent conditions that are detected as a function of the information received in steps 602 and 604. For example, a determination is made that the location of device 104 is relevant (step 606) and, if so, nearby store information is transmitted to the client device 104 (step 608). Another determination may be that device 104 has entered a respective store (step 610). In such case, one or more commands may be issued and/or processed that results in the client device 104 awakening from a sleep or other states, and a graphical user interface ("GUI") is caused to execute on the client device 104 (step 612). Various forms of alerts are supported as well, such as audible and visual cues that occur automatically upon device 104 awakening in response to a respective event. In one or more implementations, the GUI operates to access and provide information within a particular context, such as regarding a specific store item inventory, store location and item location.

Continuing with reference to the flowchart shown in FIG. 6, at step 614 a determination is made whether an item query has been received from user computing device 104. For example, a user operating device 104 may scan a barcode, take an image of a particular item or take some other action that represents a query of a particular item. In such case, item details such as image(s), price, availability, specifications or other information can be transmitted by data processing apparatus 102 to device 104 (step 616). At step 618, a determination is made whether a purchase event has occurred, such as purchasing an item at a store location. In such case, data processing apparatus 102 can be configured to capture and store information associated with the purchase (step 620). For example, item information, price, location, purchaser, quantity or the like can be transmitted to and/or captured by data processing apparatus 102 during or shortly after a respective purchase event. Further, at step 622, a determination is made whether device 104 has exited respective premises. In such case, information such as information associated with a nearby store, can be transmitted to and provided via device 104 (step 624). Other types of events that can occur in connection with physical store locations can be detected, although not necessarily represented in the flowchart shown in FIG. 6.

Figure 7:
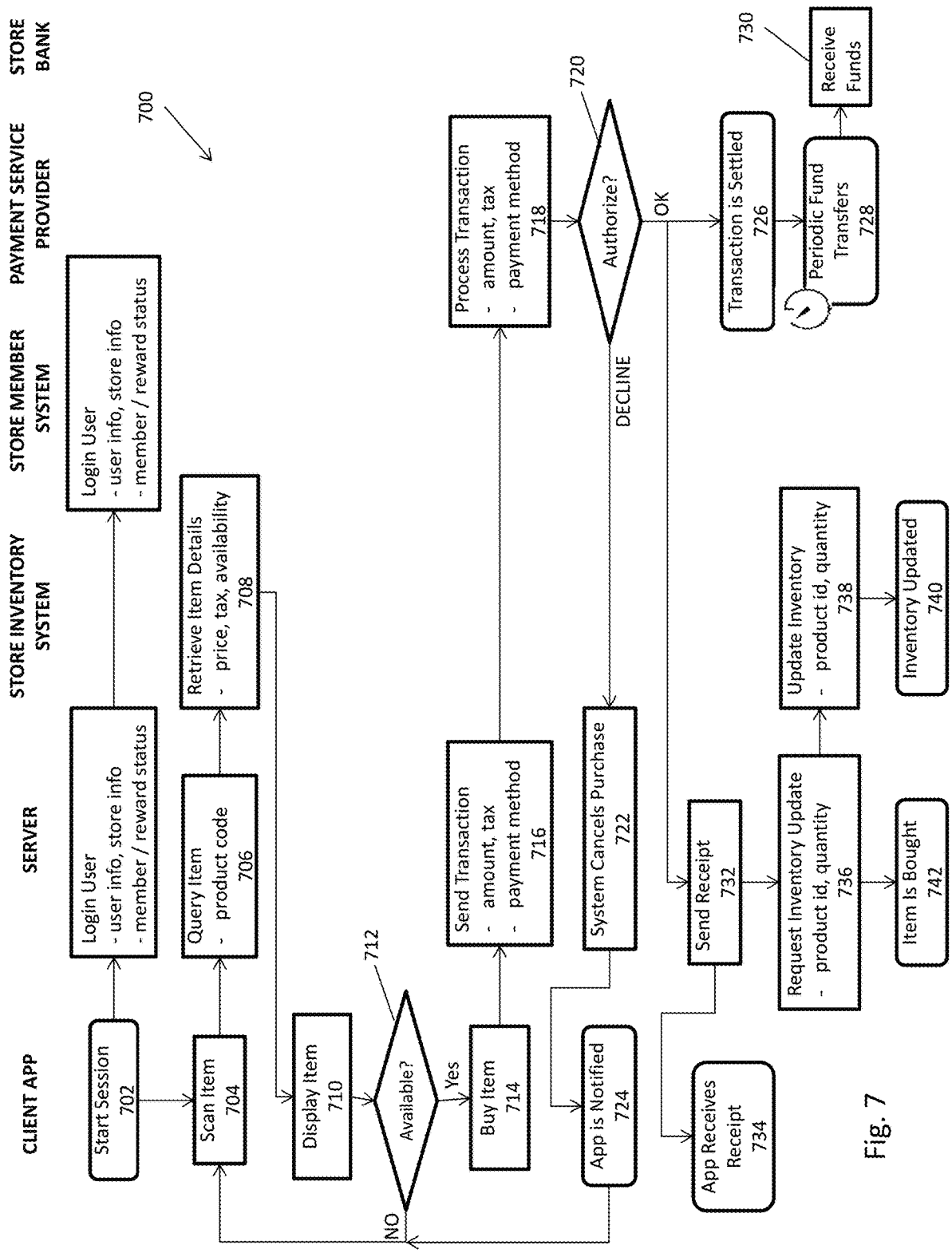
FIG. 7 is an example flow diagram showing a routine that illustrates a broad aspect of a method for back-end processing in accordance with at least one embodiment disclosed herein.

FIG. 7 is an example flow diagram showing a routine 700 that illustrates a broad aspect of a method for back-end processing in accordance with at least one implementation disclosed herein. It should be appreciated that several of the logical operations described herein are implemented (1) as a sequence of computer implemented acts or program modules running on a communication device and/or (2) as interconnected machine logic circuits or circuit modules within a communication device. The implementation can be a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 7, initially a session starts and login information is received at data processing apparatus 102, e.g., a server computing device, including user information, store information, member information and/or rewards status (step 702). At step 704, information is received representing that an item has been scanned, and a query process occurs to determine, for example, a product code (step 706) and/or various item details, such as price, tax amount or the like (step 708). Thereafter, the item is displayed (step 710) and a determination is made whether the item is available (step 712). If the item is not available, the process loops back to step 704 and information representing another scanned item is received. Alternatively, the process branches to step 714 and information representing that an item being purchased is received. In such case, information such as transaction amount (including tax amount) is received, as is a respective payment method (step 716). The information received in step 716 is processed (step 718) and a determination is made whether payment is authorized, such as with regard to sufficient funds, credit or the like (step 720). If authorization fails then, at step 722, the purchase is canceled and a notification is transmitted to a software application, for example, executing on user computing device 104 (step 724) and the process loops back to step 704. Alternatively, if the purchase is authorized then, at step 726, the transaction is settled and funds are transferred (step 728) and received (step 730). Moreover, a receipt is transmitted (step 732) and received (step 734), for example by a software application executing on user computing device 104. In addition, an inventory update request is generated, for example, with regard to product identification and quantity (step 736), which is used to update an inventory control system (steps 738, 740). At step 742, the purchase steps are complete and the item is purchased.

Figure 8:
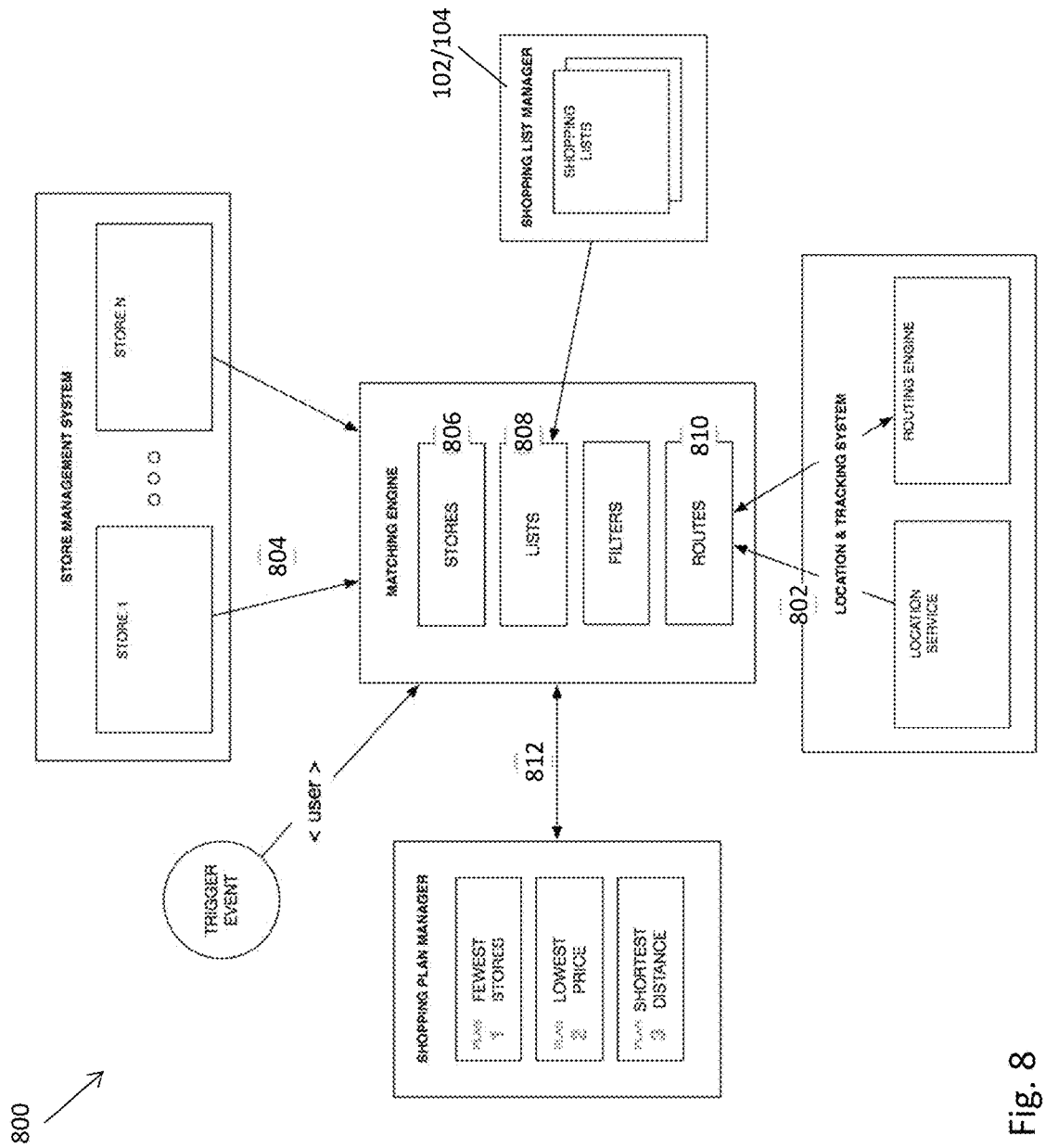
FIG. 8 is an example flow diagram showing a routine that illustrates a broad aspect of a method for generating shopping plans, in accordance with an example implementation.

FIG. 8 is an example flow diagram showing a routine that illustrates a broad aspect of a method for generating shopping plans, in accordance with an example implementation. In the example shown in FIG. 8, one or more shopping plans are generated to optimize the fewest stores, lowest prices and/or shortest traveling distance. At step 802, a user's location (e.g., via GPS module 302, FIG. 3) and/or a target location is determined, for example via a location and tracking system. Additionally, a store management system identifies specific store locations of store 1 through store N, such as that located within a predetermined radius from the target location (step 804). Thereafter, one or more query processes can determine whether products are available in specific stores (step 806), whether products that are available in specific stores match specific shopping lists, such as received via one or more shopping lists accessible or otherwise provided by a shopping list manager operating on a user computing device 104 or information processor 102 (step 808), and one or more routes (e.g., to travel) can be generated as a function of one or more rules (step 810). For example, one or more filters such as distance, specific stores, types of stores, specific shopping lists or other criteria can be used in connection with the matching stores, lists and routes in connection with generating a preferred shopping plan.

Figure 9:
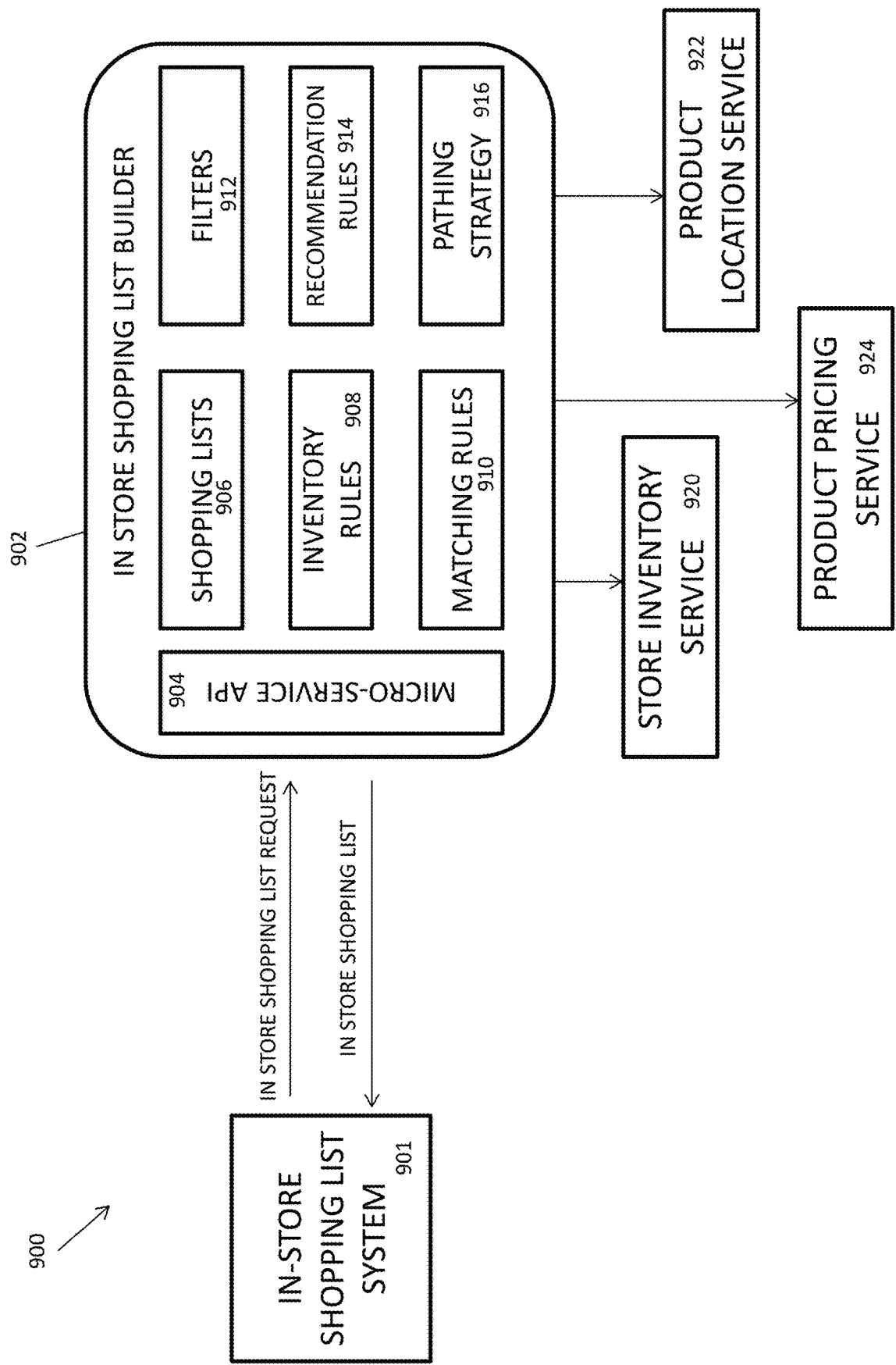
FIG. 9 is an example block diagram showing elements associated with an in store shopping list builder, in accordance with an example implementation of the present application.

FIG. 9 is an example block diagram showing elements 900 associated with an in-store shopping list builder 902, in accordance with an example implementation of the present application. The builder 902 can be implemented, for example, via user computing device 104 and/or information processor 102, and can send/receive information to/from user computing device 104 and/or information processor 102, respectively, vis-à-vis an in-store shopping list system 901 200 line for example, and in-store shopping list request is transmitted to and replies received from the builder 902 as a function of a micro service application programming interface 904, and responses replies. The ending-store shopping list builder 902 can include information stored on non-transitory processor readable media, such as data for shopping lists 906, inventory rules 908 and matching rules 910 for implementing respective lists. In addition, filters 912, recommendation rules 914 and "pathing" strategies 916 for maximizing efficiency are provided and output information for a store inventory service 920, product location service 922 and/or product pricing service 924.

Figure 10:
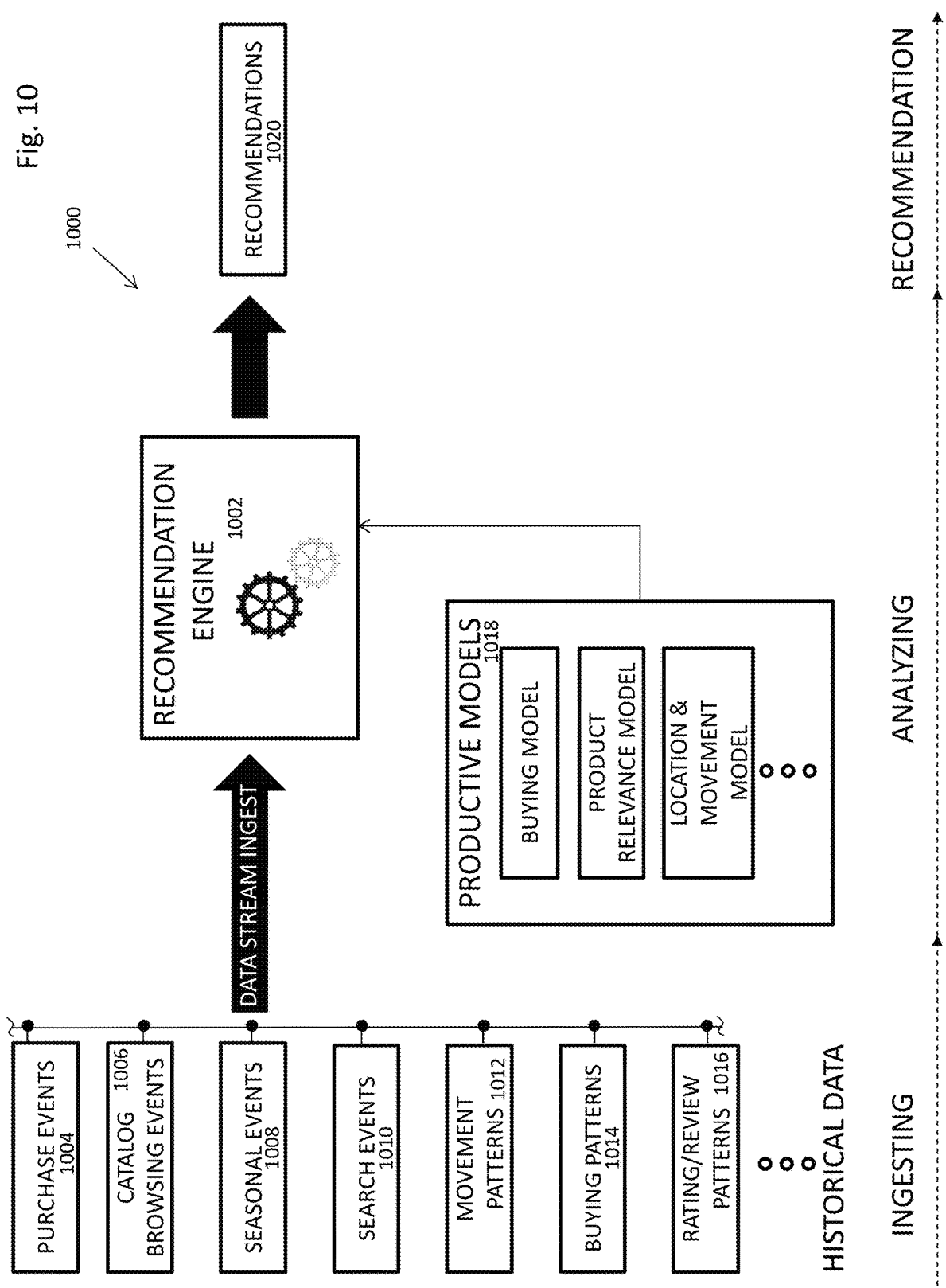
FIG. 10 is a high-level diagram illustrating features associated with product recommendation in connection with specific contexts.

FIG. 10 is a high-level diagram illustrating features 1000 associated with product recommendation in connection with specific contexts. For example, recommendation engine 1002, which can be implemented, for example, via user computing device 104 and/or information processor 102, receives data via one or more data stream ingest processes. For example, information associated with one or more of: purchase events 1004, catalog browsing events 1006, seasonal events 1008, search events 1010, movement patterns 1012, buying patterns 1014 and rating/review patterns 1016 and other suitable events, such as relating to historical data, is received by recommendation engine 1002. In addition, the information received via the data stream ingest processes can be processed in accordance with one or more models 1018, such as a buying model, a product relevance model and a location/movement model. The processed information can be applied to one or more suitable recommendations 1020.

Figure 11:
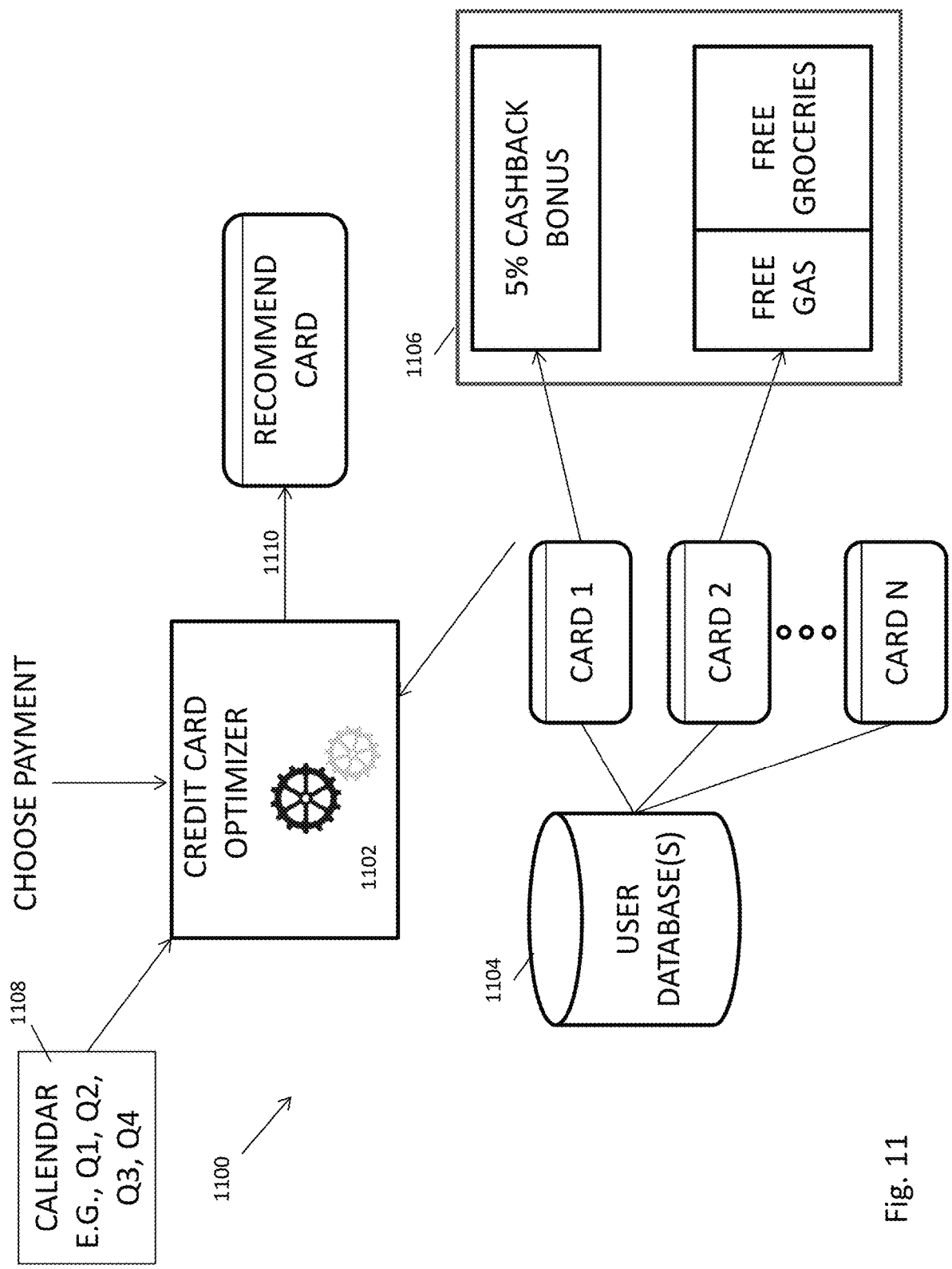
FIG. 11 is a high-level diagram illustrating features associated with optimizing payment in accordance with one or more implementations of the present application.

FIG. 11 is a high-level diagram illustrating features 1100 associated with optimizing payment in accordance with one or more implementations of the present application. In the example shown in FIG. 11, a credit card optimizer engine 1102 receives and processes information to make a recommendation of a respective account or card to use to pay for goods/services. At step 1104, user payment type information, such as specific credit card transaction accounts associated with each of a plurality users, is collected and stored in one or more user databases. Each of a plurality of respective payment methods, (e.g., cards 1-N), for example, are usable for a given user to purchase a good/service. One or more of the cards includes an associated offer, such as a value representing a percentage of the purchase price, free gas, free groceries, or other offer. Some of the offers may correspond with a respective time of year (e.g., calendar quarter), some may correspond with a respective store or company, a respective product, or other detail. Information associated with bonuses, rewards, offers or the like, per transaction card, are referenced or otherwise stored in one or more databases (1106). A respective optimized payment type is chosen, based on particular criteria, including a respective calendar quarter (11080), store type, promotion, product or the like. The optimizer engine 1102 processes the information to recommend (1110) a respective payment card/payment type.

Thus, as shown and described herein, a user-location detection system and method is provided to facilitate and improve interactivity between devices, including as a function of data transfer rates, data storage facilities, network connectivity, security and energy. Hardware and software modules 300 and 350, for example, are configured with or to interface with user computing devices 104 and/or data processing apparatuses 102 including with regard to geo-fencing and awareness of respective device locations. Location information associated with a plurality of user computing devices 104 periodically, regularly and/or continuously updates at least one data processing apparatus 102, which in turn transmits relevant information to the devices 104 such as relating to geo-fencing of stores, Wi-Fi SS IDs, beacons or the like.

Moreover, information is transmitted from one or more user computing devices 104 to a respective one or more data processing apparatuses 102 representing specific events, such as a computing device 104 detecting a respective geo-fence, a respective store Wi-Fi SSID, a respective beacon, a scanning of a QR code, an NFC scan, or other store/product related event. These inform the data processing apparatus 102 and facilitate further data management and processing. Other events such as exit-related events in connection with a purchase, a lengthy period of inactivity, a departure from a geo-fenced area, a loss of Wi-Fi connection, or a subsequent arrival at a different location also contribute to data management processes, such as shown and described herein. Additionally, one or more data caches configured with or user computing devices 104 can receive and store information received from one or more respective data processing apparatuses 102 for further data management. For example, item details, prices, store locations, inventory photographs or the like can be stored "locally" on devices 104 for present and future operations. One or more software applications executing on the user computing device 104 can be provided via a data processing apparatus 102 to enable users to define shopping lists and to receive and provide relevant data and information received from data processing apparatus 102 to recommend and/or refine recommended store locations, and to list stores to be visited in a particular order for maximal efficiency, as well as to recommend specific items that a user may frequently purchase or for which a user previously indicated a desire.

In accordance with one or more implementations of the present application, information associated with many users, stores, products and the like, is managed for users to identify products and locations that may be available in competitors' locations. For example, a user may be in a respective store and scanning a respective product. Information associated with the scanned product is transmitted to data processing apparatus 102 and used to identify availability and prices in competitor locations. In case a similar or same product is available at a competitor's location, a determination can be made using various factors whether it would be preferable for the user to leave the present location to purchase at the competitor's location. Factors that can go into such a determination can include, for example, a distance to the competitor's location, the amount of time the competitor's location will remain open, the inventory availability of the product, and other previously identified and possibly subjective variables provided by the user. For example, even though a product may be available at a competitor's location at a lower price point, a user may not want to be informed thereof on the grounds that the user does not like the particular store, or some other factor may contribute to the user's opinion. In one or more implementations, user profiles can include various data points, such as identifications of specific merchants or locations where a user refuses to frequent, a specific price discount that is necessary for alternative location to be recommended, or other data conditions that are customized and particular to each respective user.

In addition to tailoring data management and transmissions as a function of consumers, the present application is similarly suitable for merchant data and activity in order to promote merchant-interests as well. For example, geographic maps, store layouts, product information including prices, images, availability, upcoming discounts or the like, as well as geo-fencing information, Wi-Fi SSIDs such as shown and described herein, are all available to increase customer traffic in physical brick-and-mortar stores in ways that were heretofore unavailable.

The subject matter described above is provided by way of illustration only and should not be construed as limiting. Various modifications and changes can be made to the subject matter described herein without following the example embodiments and applications illustrated and described, and without departing from the true spirit and scope of the present application.

What is claimed:

1. A method, comprising:

receiving, by a processor over a communication network from each of a plurality of respective user computing devices, location information representing at least a respective location of each of the plurality of user computing devices;

generating, by the processor as a function of the received location information, nearby store information representing at least one store located within a predetermined distance from a respective location of at least one of the plurality of user computing devices;

transmitting, by the processor to a respective one of the plurality of user computing devices, at least some of the generated store information;

receiving, by the processor over a communication network at a first time from one of the plurality of computing devices, enter store event information representing a first data transfer between the one user computing device and at least a computing device associated with a store represented by the nearby store information;

storing, by the processor, at least some of the received enter store event information in at least one database;

receiving, by the processor over a communication network at a second time from the one of the plurality of computing devices, item information representing an item offered for sale by the one store represented by the nearby store information;

generating, by the processor as a function of the received item information, item details information representing at least price, tax and inventory availability associated with the item;

transmitting, by the processor to the one of the plurality of user computing device, at least some of the generated item details information;
configuring each of the respective plurality of user computing devices, with a software application, to generate the location information as a function of network information received by:
a global positioning system receiver;
a Wi-Fi network receiver;
a radio-frequency signal receiver; and/or
an image receiver,
wherein the software application further configures the one of the plurality of computing devices to:
awaken from a sleep state upon receiving information representing that the one of the plurality of computing devices has entered the one store; and
in response to awakening from the sleep state, activate a graphical user interface on the one of the plurality of computing devices;
generating, by the processor as a function of the received enter store event information, store map information representing a store layout of the one store, wherein at least a portion of the store map information is formattable as a graphical image;
transmitting, by the processor to the one of the plurality user computing devices, at least some of the generated store map information;
modifying, by the processor, the store map information to represent a location within the store layout where the item is located in the store; and
transmitting, by the processor to the one of the plurality user computing devices, at least some of the modified store map information,
wherein the at least some of the generated store map information is transmitted by the processor prior to the second time, and the at least some of the modified store map information is transmitted by the processor after the second time.

2. The method of claim 1, further comprising receiving, by the processor over a communication network at a fourth time from the one of the plurality of computing devices, exit store event information representing a data transfer between the one user computing device and at least a computing device associated with the store represented by the nearby store information.

3. The method of claim 1, wherein the at least one database is updated by the processor as a function of an application programming interface.

4. The method of claim 1, further comprising:
generating, by the processor, a purchase receipt for the item; and
transmitting, by the processor to the one of the plurality of user computing devices, the purchase receipt.

5. The method of claim 1, wherein the nearby store information is generated as a function of: a number of stores within the predetermined distance; a price of at least one item offered for sale in the at least one store; and/or a calculated distance.

6. A system, comprising:
a hardware device having a processor and non-transitory processor readable media having processor executable code that, when executed by the processor, causes the hardware device to:
receive, over a communication network from each of a plurality of respective user computing devices, location information representing at least a respective location of each of the plurality of user computing devices;
generate, as a function of the received location information, nearby store information representing at least one store located within a predetermined distance from a respective location of at least one of the plurality of user computing devices;
transmit, to a respective one of the plurality of user computing devices, at least some of the generated store information;
receive, over a communication network at a first time from one of the plurality of computing devices, enter store event information representing a first data transfer between the one user computing device and at least a computing device associated with a store represented by the nearby store information;
store at least some of the received enter store event information in at least one database;
receive, over a communication network at a second time from the one of the plurality of computing devices, item information representing an item offered for sale by the one store represented by the nearby store information;
generate, as a function of the received item information, item details information representing at least price, tax and inventory availability associated with the item;
transmit, to the one of the plurality of user computing device, at least some of the generated item details information;
configure each of the respective plurality of user computing devices, with a software application, to generate the location information as a function of network information received by:
a global positioning system receiver;
a Wi-Fi network receiver;
a radio-frequency signal receiver; and/or
an image receiver,
wherein the software application further configures the one of the plurality of computing devices to:
awaken from a sleep state upon receiving information representing that the one of the plurality of computing devices has entered the one store; and
in response to awakening from the sleep state, activate a graphical user interface on the one of the plurality of computing devices;
generate as a function of the received enter store event information, store map information representing a store layout of the one store, wherein at least a portion of the store map information is formattable as a graphical image;
transmit to the one of the plurality user computing devices, at least some of the generated store map information;
modify the store map information to represent a location within the store layout where the item is located in the store; and
transmit to the one of the plurality user computing devices, at least some of the modified store map information,
wherein the at least some of the generated store map information is transmitted by the processor prior to the second time, and the at least some of the modified store map information is transmitted by the processor after the second time.

7. The system of claim 6, wherein non-transitory processor readable media further has processor executable code that, when executed by the processor, causes the hardware device to: receive, over a communication network at a fourth time from the one of the plurality of computing devices, exit store event information representing a data transfer between the one user computing device and at least a computing device associated with the store represented by the nearby store information.

8. The system of claim 6, wherein the at least one database is updated by the processor as a function of an application programming interface.

9. The system of claim 6, wherein non-transitory processor readable media further has processor executable code that, when executed by the processor, causes the hardware device to:

generate a purchase receipt for the item; and transmit, to the one of the plurality of user computing devices, the purchase receipt.

10. The system of claim 6, wherein the nearby store information is generated as a function of: a number of stores within the predetermined distance; a price of at least one item offered for sale in the at least one store; and/or a calculated distance.

11. The method of claim 1, further comprising:

receiving, by the processor over a communication network at a third time from the one of the plurality of computing devices, purchase event information representing a purchase of the item from the one store.

12. The method of claim 11, further comprising:

updating, by the processor, as a function of the received purchase event information, at least one database associated with item inventory of the one store.

13. The system of claim 6, wherein non-transitory processor readable media further has processor executable code that, when executed by the processor, causes the hardware device to:

receive, over a communication network at a third time from the one of the plurality of computing devices, purchase event information representing a purchase of the item from the one store.

14. The system of claim 13, wherein non-transitory processor readable media further has processor executable code that, when executed by the processor, causes the hardware device to:

update, as a function of the received purchase event information, at least one database associated with item inventory of the one store.

\* \* \* \* \*